US010417950B2

(12) United States Patent
Deering et al.

(10) Patent No.: US 10,417,950 B2
(45) Date of Patent: Sep. 17, 2019

(54) SUBPIXEL LAYOUTS FOR EYE-MOUNTED DISPLAYS (71) Applicant: Spy Eye, LLC, Los Gatos, CA (US)

(72) Inventors: Michael Frank Deering, Los Altos, CA (US); Paul Scott Martin, Palo Alto, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 15/890,231

(22) Filed: Feb. 6, 2018

(65) Prior Publication Data

US 2019/0244557 A1 Aug. 8, 2019

(51) Int. Cl.
*G09G 5/02* (2006.01)
*G09G 3/20* (2006.01)
*G02C 7/04* (2006.01)
*G02C 11/00* (2006.01)
*G03B 21/20* (2006.01)
*G02B 27/01* (2006.01)
*G09G 3/32* (2016.01)

(52) U.S. Cl.
CPC ....... *G09G 3/2003* (2013.01); *G02B 27/0172* (2013.01); *G02C 7/04* (2013.01); *G02C 11/10* (2013.01); *G03B 21/2013* (2013.01); *G03B 21/2033* (2013.01); *G09G 3/32* (2013.01); *G09G 2300/0443* (2013.01); *G09G 2320/0666* (2013.01)

(58) Field of Classification Search
CPC ......... G06F 3/013; G03B 21/00; G03B 21/14; G03B 2213/025; G03B 21/2053; G02C 7/04; G06G 3/10; H01L 31/02024; G09G 2320/0626
See application file for complete search history.

(56) References Cited

U.S. PATENT DOCUMENTS 6,851,805 B2 2/2005 Blum et al.
6,950,115 B2 9/2005 Brown Elliott
7,646,398 B2 1/2010 Brown Elliott
7,728,802 B2 6/2010 Brown Elliott
(Continued)

FOREIGN PATENT DOCUMENTS

EP 1462844 A2 9/2004

OTHER PUBLICATIONS

Roorda, A. et al., "The Arrangement of the Three Cone Classes in the Living Human Eye," Nature, Feb. 11, 1999, pp. 520-522, vol. 397.

*Primary Examiner* — Kent W Chang
*Assistant Examiner* — Andrew Lee
(74) *Attorney, Agent, or Firm* — Fenwick & West LLP (57) ABSTRACT A color eye-mounted display typically contains different color light emitters, with red, green and blue being the most common color combination. In one approach, the resolution of the red, green and blue components is not the same. For example, there may be more individually addressable red or green subpixels than blue subpixels. In hardware, this may be implemented by using fewer blue light emitters. Alternately, there may be equal numbers of red, green and blue light emitters, but the blue light emitters are not individually addressable and are grouped together to form larger blue subpixels. For example, three or more blue light emitters may form one addressable blue subpixel.

20 Claims, 12 Drawing Sheets (56) References Cited

U.S. PATENT DOCUMENTS

| | | | |
|---|---|---|---|
| 8,096,654 B2 | 1/2012 | Amirparviz et al. | |
| 8,971,978 B2 | 3/2015 | Ho et al. | |
| 9,158,133 B1 | 10/2015 | Pletcher et al. | |
| 2004/0227869 A1 | 11/2004 | Martynov et al. | |
| 2005/0248262 A1 | 11/2005 | Brown Elliott | |
| 2014/0098226 A1 | 4/2014 | Pletcher et al. | |
| 2015/0312560 A1* | 10/2015 | Deering | G02B 13/0085 345/1.3 |
| 2016/0097940 A1* | 4/2016 | Sako | G02C 7/101 351/158 |
| 2016/0299354 A1 | 10/2016 | Shtukater | |
| 2016/0317090 A1* | 11/2016 | Han | A61B 5/1486 |
| 2016/0321989 A1* | 11/2016 | Dighde | G09G 3/3258 |
| 2016/0322432 A1* | 11/2016 | Yang | H01L 27/3218 |
| 2017/0371184 A1 | 12/2017 | Shtukater | |

* cited by examiner

SUBPIXEL LAYOUTS FOR EYE-MOUNTED DISPLAYS

BACKGROUND

1. Technical Field

This disclosure relates generally to the organization of light emitters into subpixels in eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the lens. The projector must be very small to fit in the contact lens, so small that Deering called it a "femtoprojector". A typical femtoprojector preferably is no larger than about a millimeter in any dimension.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as additions to the external environment.

Goggles and other types of head-mounted displays have also been proposed for these types of applications. Communicating image data to and projecting images from these head-mounted displays is a simpler problem because they can be larger in size than an eye-mounted display. They can consume more power and they can receive data over wired transmission. In contrast, eye-mounted displays present unique challenges because of their size and location mounted on the eye.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

The display functionality of an eye-mounted display can be divided into a backplane and a frontplane. The backplane receives data (e.g., data packets) that specify the image to be projected by the eye-mounted display. It converts this data to drive signals (e.g., drive currents for LEDs) to drive the frontplane. The frontplane contains an array of light emitters (e.g., LEDs) that produce light according to the drive signals, thus generating the desired image.

The frontplane for a conventional color display typically contains different color light emitters, with red, green and blue being the most common color combination. Furthermore, there may be equal numbers of red, green and blue light emitters, and each of these light emitters is individually addressable. For example, if the display has an overall resolution of M×N color pixels, then the frontplane typically contains M×N red light emitters, M×N green light emitters and M×N blue light emitters, for a total addressable array of 3(M×N) light emitters. The full frame data is received by the display at a frame rate that is fast enough to appear as continuous motion. However, this requires the display to receive and process a large quantity of data, which in turn requires a large data bandwidth and high power consumption.

Eye-mounted displays, however, have unique constraints because of their size and location on the eye. Accordingly, approaches that are suitable for externally located displays may not be suitable for eye-mounted displays. For example, in one approach more suitable for eye-mounted displays, the resolution of the red, green and blue components is not the same. For example, there may be more individually addressable red or green subpixels than blue subpixels. In hardware, this may be implemented by using fewer blue light emitters. Alternately, there may be equal numbers of red, green and blue light emitters, but the blue light emitters are not individually addressable and are grouped together to form larger blue subpixels. For example, three or more blue light emitters may form one addressable blue subpixel.

The ratio of R:G:B cones in the retina is approximately 6:6:1 or higher. Some sources suggest ratios as high as 13:7:1. Humans have better red and green acuity than blue acuity. This means that an eye-mounted display may have fewer blue subpixels than red or green subpixels without affecting the user's perception of display sharpness. Preferably, the ratio of R:G:B subpixels in an eye-mounted display should be N:N:1 where N≥3. N=6 would better approximate the ratio of cones in the retina compared to a more conventional display with a ratio of 1:1:1 of R:G:B subpixels. In addition, because it is eye-mounted, each femtoprojector(s) in an eye-mounted display projects to the same region of the retina. As a result, the ratio of R:G:B subpixels in an eye mounted display can be tailored to match a particular region of the retina. For example, some regions of the retina have no blue cones. Displays, or parts of displays, aimed at these regions need not have any blue subpixels.

Alternately, the ratio of R:G:B subpixels may be the same over a display, but the resolution may vary. The part of the display that projects images to the fovea may contain a ratio of 6:6:1 of higher resolution R:G:B subpixels, while the part of the display that projects images to the periphery of the retina may contain the same ratio of 6:6:1 but of lower resolution R:G:B subpixels.

Figure 1A:
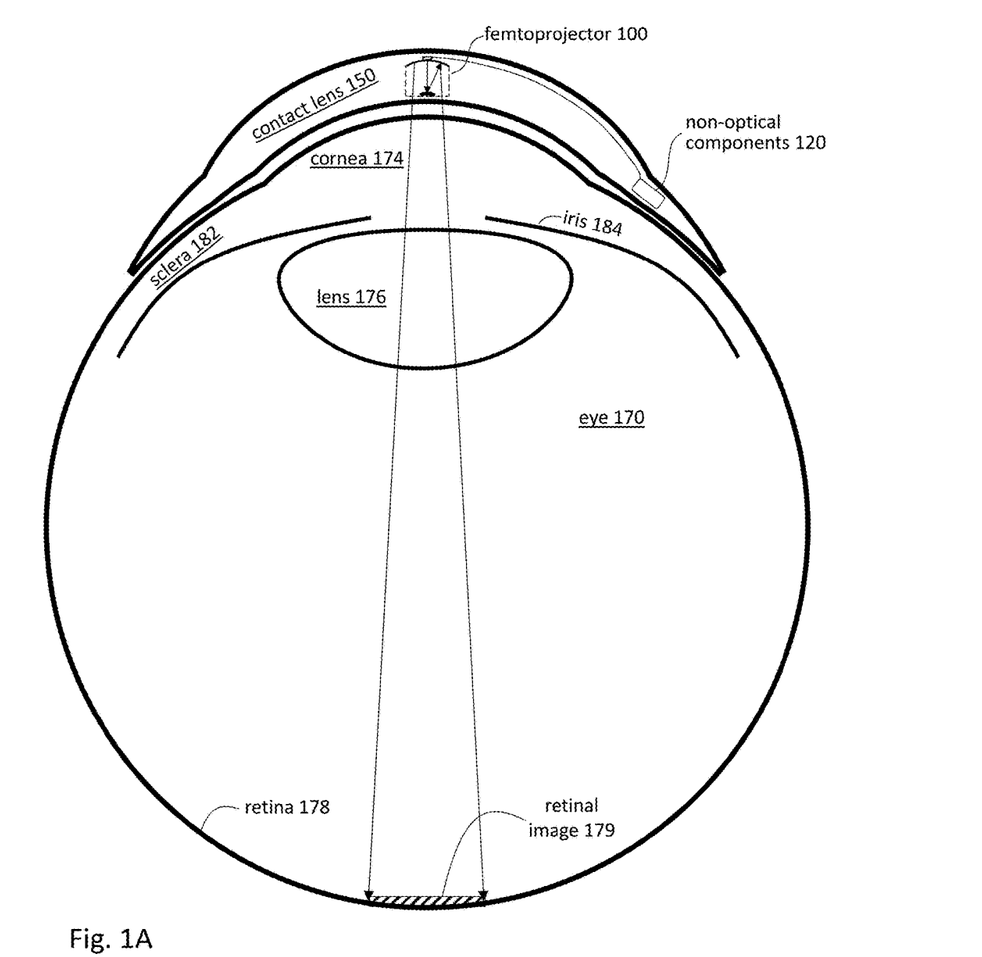
FIG. 1A shows a cross sectional view of an eye-mounted display containing a femtoprojector in a contact lens.

In more detail, FIG. 1A shows a cross sectional view of an eye-mounted display containing a femtoprojector 100 in a contact lens 150. FIG. 1A shows an embodiment using a scleral contact lens but the contact lens does not have to be scleral. The contact lens 150 is separated from the cornea 174 of the user's eye 170 by a tear layer. Over the cornea 174, the tear layer may be as thick as a hundred microns or more while it may be only a few microns thick over the sclera 182. The aqueous of the eyeball is located between the cornea and the crystalline lens 176 of the eye. The vitreous fills most of the eyeball including the volume between the intraocular lens 176 and the retina 178. The iris 184 limits the aperture of the eye.

The contact lens 150 preferably has a thickness that is less than two mm, and the femtoprojector 100 preferably fits in a 2 mm by 2 mm by 2 mm volume. The contact lens 150 is comfortable to wear and maintains eye health by permitting oxygen to reach the cornea 174.

In the example design of FIG. 1A, the optical path from the image source in the femtoprojector 100 to the image 179 on the retina 178 does not include any air gaps, although this is not required. As a result, the femtoprojector 100 embedded in contact lens 150 is insensitive to the air-cornea interface that provides most of the focusing power in an unaided eye. Further, the system is not affected by variations in cornea shape that occur from one person to another.

Figure 1B:
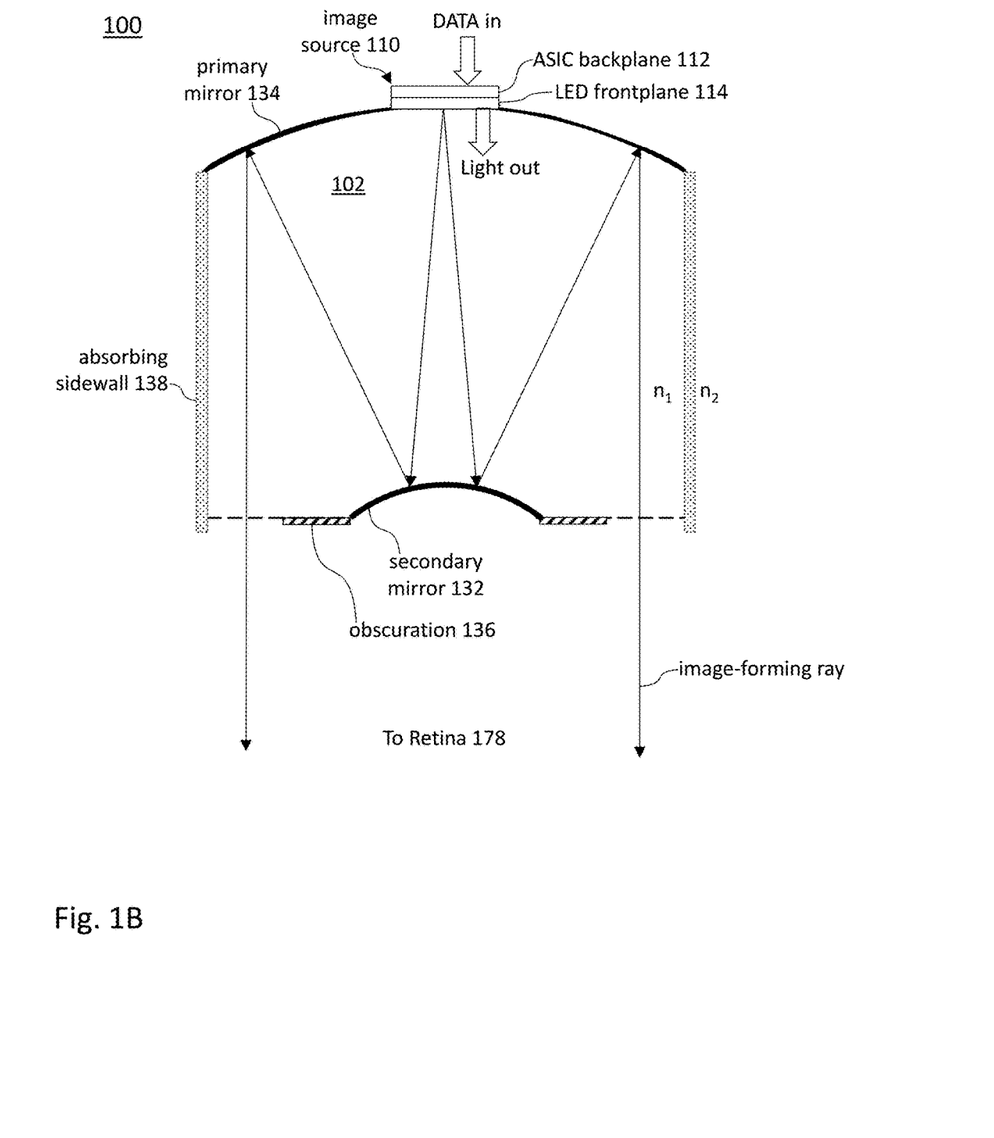
FIG. 1B shows a cross sectional view of a femtoprojector.

FIG. 1B shows a cross sectional view of one embodiment of a femtoprojector 100. It includes a solid, transparent substrate 102 having index of refraction $n_1$. Contact lens material, in which a femtoprojector optical system may be embedded, has an index of refraction $n_2$. The solid transparent substrate 102 may be made from plastic, glass or other transparent materials.

The femtoprojector 100 includes a concave primary mirror 134 and a convex secondary mirror 132. Either or both of these may be aspheric. The concave primary mirror 134 may be formed by coating an end of the substrate 102 with a reflective material such as a metal (e.g. aluminum or silver) or an engineered stack of dielectric layers. The primary mirror 134 includes an opening. An image source 110, such as an LED (light emitting diode) display chip with an array of individually addressable light emitters, is mounted at this opening. Alternate image sources include illuminated photomasks or single light emitting diodes, as examples.

The image source 110 includes a backplane 112 and a frontplane 114. In this example, the backplane 112 is an application specific integrated circuit (ASIC) and the frontplane 114 is an LED array. The ASIC 112 and LED array 114 are manufactured separately and later bonded together to form electrical connections. Alternately, the backplane 112 and frontplane 114 can be integrated on a single common substrate. The electronics 112 receive data packets from a source external to the eye-mounted display. The ASIC 112 converts the data packets to drive currents for the LED array 114, which produces light that is projected by the optical system to the user's retina 178. To save power, the ASIC 112 may power down the LED array 114 (or parts of the LED array 114) when no data packets are received. If the data packets are clocked, the no signal situation may be detected when there is no clock present, for example if there is no clock signal on clock input pins or if no clock can be recovered from the incoming data stream.

The secondary mirror 132 faces the image source 110, and the primary mirror 134 faces the secondary mirror 132. Light rays from the image source 110 are first incident on and reflected by the secondary mirror 132 (convex in this example). The reflected rays are then incident on and further reflected by the primary mirror 134 before exiting the optical system. The primary mirror 134 is "primary" because it is bigger than the secondary mirror 132. The secondary mirror 132 and primary mirror 134 cooperate to project the image from the image source 110 onto the user's retina. In this example, an annular obscuration 136 and absorbing sidewalls 138 are used to control stray light from the LED frontplane 114.

Figure 1C:
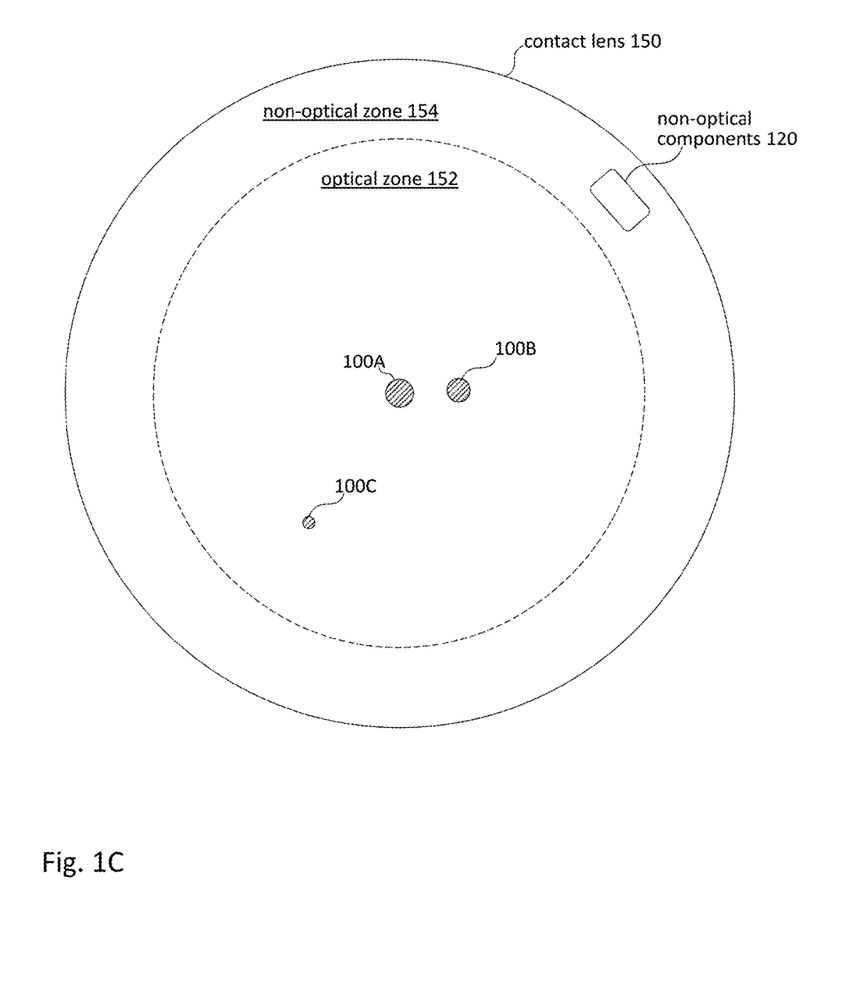
FIG. 1C shows a plan view of an eye-mounted display containing multiple femtoprojectors in a contact lens.

FIG. 1C shows a plan view of an eye-mounted display with multiple femtoprojectors 100A-C in a contact lens 150. This plan view is taken looking at the display from the top of FIG. 1A. The ratio of the contact lens diameter to femtoprojector lateral size is preferably roughly 25:1 for the largest femtoprojector. This ratio is normally between about 15:1 and 30:1, but may be as small as 5:1 or as large as 50:1. FIG. 1C shows three femtoprojectors 100A-C in the contact lens, but many femtoprojectors, or only one, may be mounted in such a lens. Eye-mounted displays with as many as 49 femtoprojectors in a contact lens have been proposed. If there is only one femtoprojector in a lens, it need not be in the center of the lens. The femtoprojectors 100A-C in FIG. 1C are also shown as different sizes, although they could also be the same size.

In FIG. 1C, the contact lens 150 is roughly divided by the dashed circle into an optical zone 152 and a non-optical zone 154. Components in the optical zone 152 (such as the femtoprojectors 100) may be in the optical path of the eye, depending on how far open the iris is. Components 120 in the non-optical zone 154 fall outside the aperture of the eye. In addition to the femtoprojectors 100, the contact lens may also contain other components for data transmission, power and/or positioning. Data transmission components may include antennae or optical/infrared photodetectors, data storage and buffering, controls, and possibly also on-lens processing. Power components may include coils for power transmission and batteries for power storage. Positioning components may include accelerometers and fiducial or other structures used for eye tracking and head tracking.

In addition to the eye-mounted display, the overall system may also include a head tracker, eye tracker and scaler. The system receives input images (including possibly video), which are to be displayed to the human user via the eye-mounted display. The femtoprojectors project the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

Figure 2:
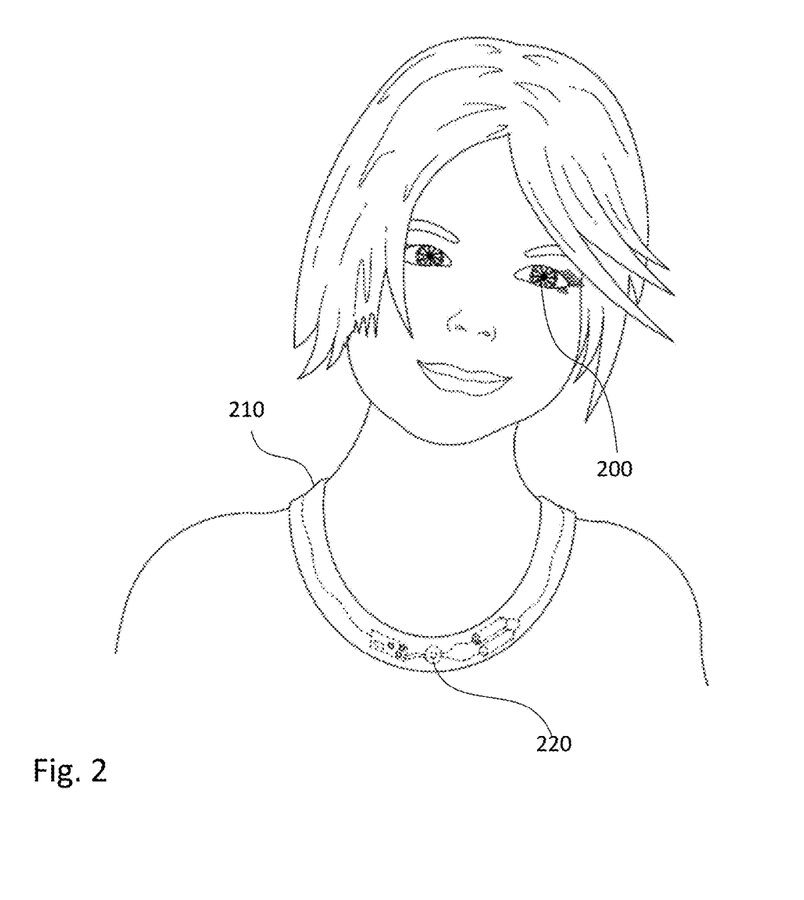
FIG. 2 shows a user wearing a necklace in communication with an eye-mounted display.

For example, FIG. 2 shows an implementation where, in addition to the eye-mounted display 200, the user is also wearing a necklace 210 that contains components of the eye-mounted display system. In this example, the necklace 210 includes a wireless transmitter 220 that transmits image data to the eye-mounted display 200. For an eye-mounted display, this transmission preferably is lower bandwidth, both because the available bandwidth is limited and because it is desirable to reduce the complexity and power consumption of electronics in the eye-mounted display.

Figure 3:
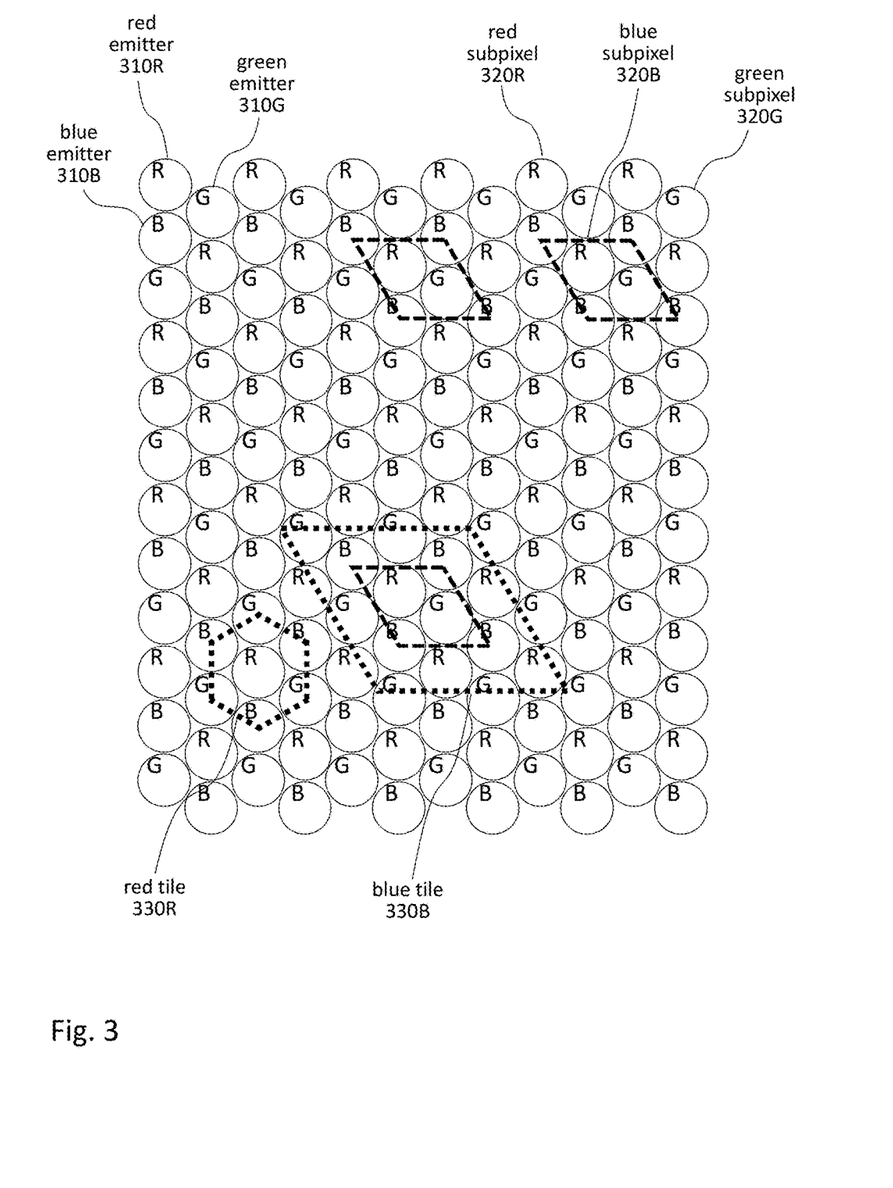
FIG. 3 shows a hexagonal array of red, green and blue light emitters.

Referring to FIG. 1B, the array 114 of light emitters can have different geometries and different addressing. FIG. 3 shows a hexagonal array of red, green and blue light emitters. Each circle represents a light emitter 310, with the letters R,G,B denoting red, green and blue light emitters. In FIG. 3, there are an equal number of red, green and blue light emitters. However, not all of the emitters are individually addressable. In this example, the blue emitters are grouped into groups of four emitters, as indicated by the dashed trapezoids 320B. A group of one or more emitters that is controlled together will be referred to as a subpixel. In this example, each blue subpixel 320B includes four blue emitters 310B. Each red or green subpixel 320R,G includes a single red or green emitter 310R,G.

The differently shaped subpixels 320 result in different tilings of the array. The red and green subpixels 320R,G result in a hexagonal tiling, as shown by the dotted hexagon 330R for the red subpixel. The dotted hexagon 330R is the boundary that is halfway between the center red subpixel (which is just a single light emitter) and each of its nearest neighbor red subpixels. The green subpixels will have similar hexagonal tiles. The blue subpixels 320B result in diamond shaped tiles 330B.

One advantage of this approach is that the amount of data can be reduced without significantly impacting the perceived quality of the resulting image. In this example, the data for the blue subpixels is reduced by a factor of four.

Figure 4A:
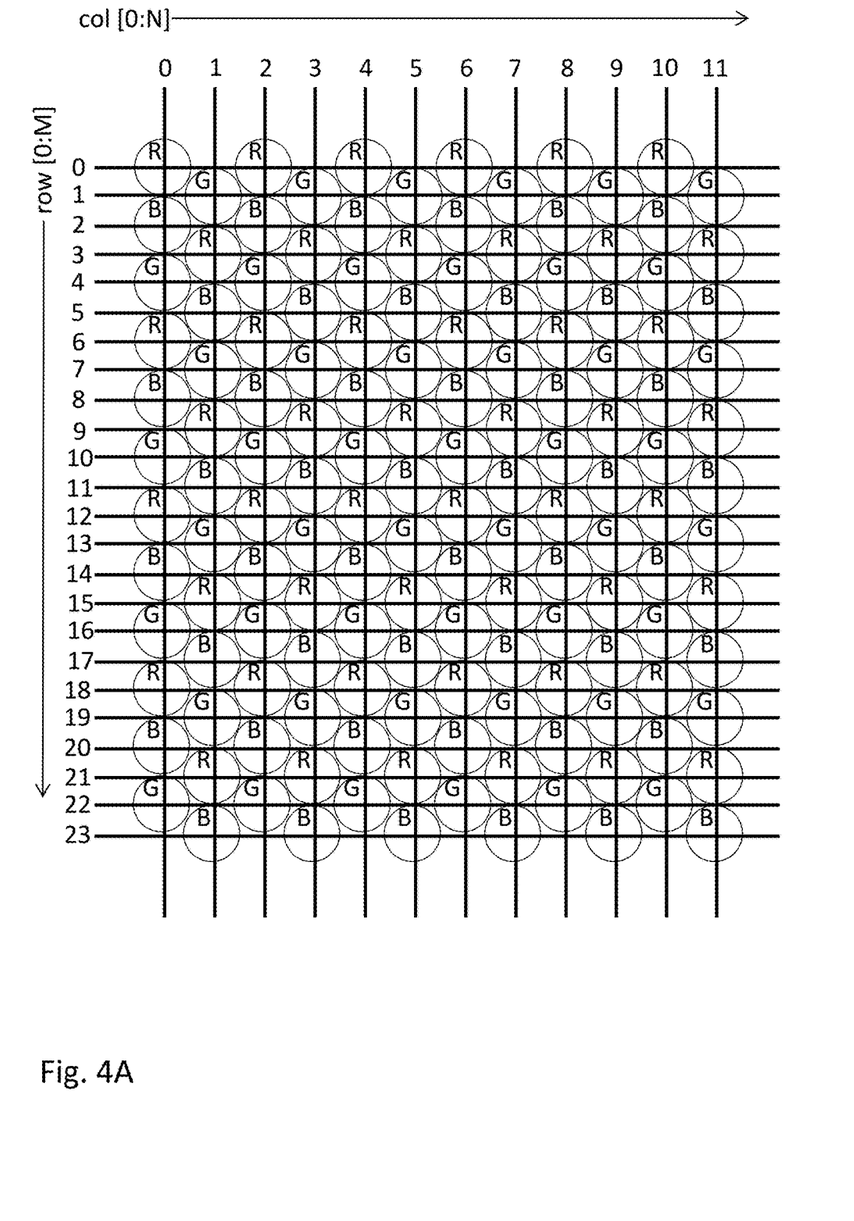
FIGS. 4A-4D show row and column addressing for the arrays of red, green and blue light emitters of FIG. 3.

The organization of light emitters into subpixels can be implemented in either hardware or software. FIGS. 4A-4D show a hardware implementation of the organization from FIG. 3. In this implementation, a common set of row and column address lines are used to address all the subpixels. As shown in FIG. 4A, there are 12 column address lines and 24 row address lines for the array. Each row addresses light emitters of only one color. This implementation uses straight horizontal and vertical address lines even though the array is hexagonal. As a result, there are a total 288 intersections of row and column address lines to address an array of 144 light emitters. That is, half the intersections are not used.

Figure 4B:
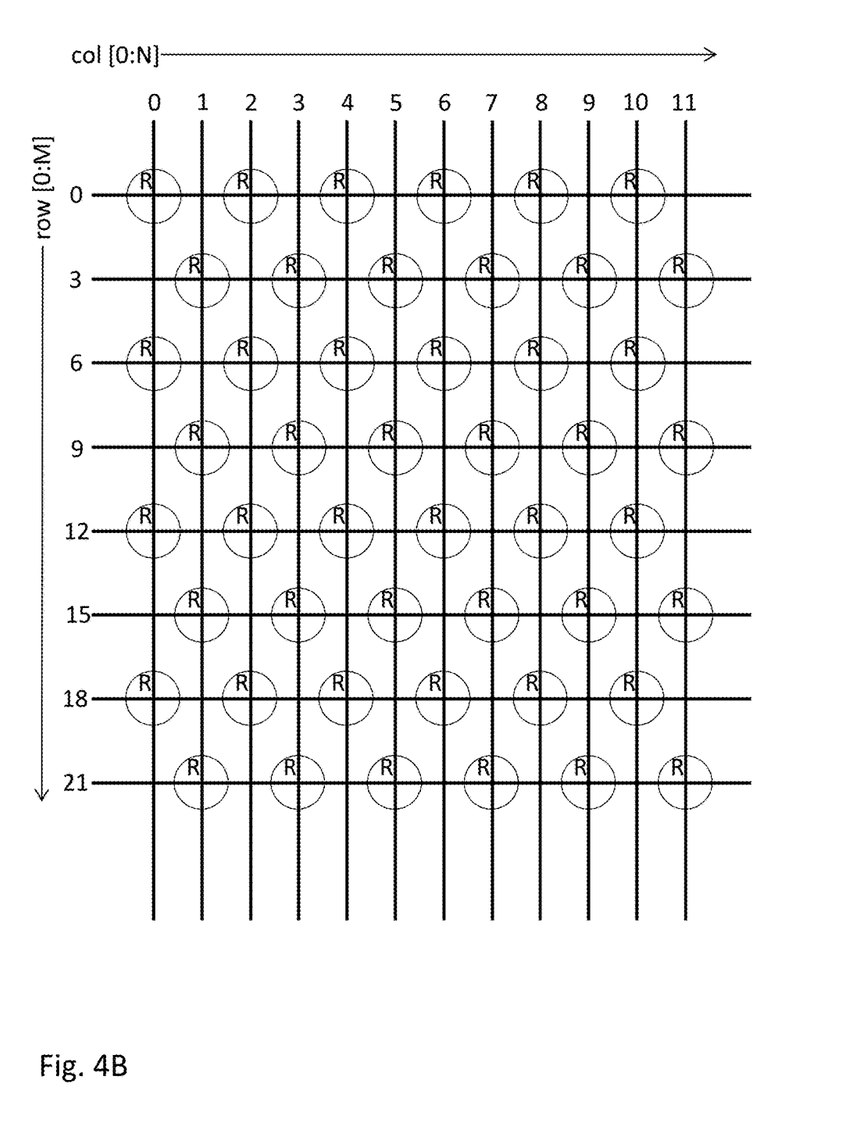
Figure 4C:
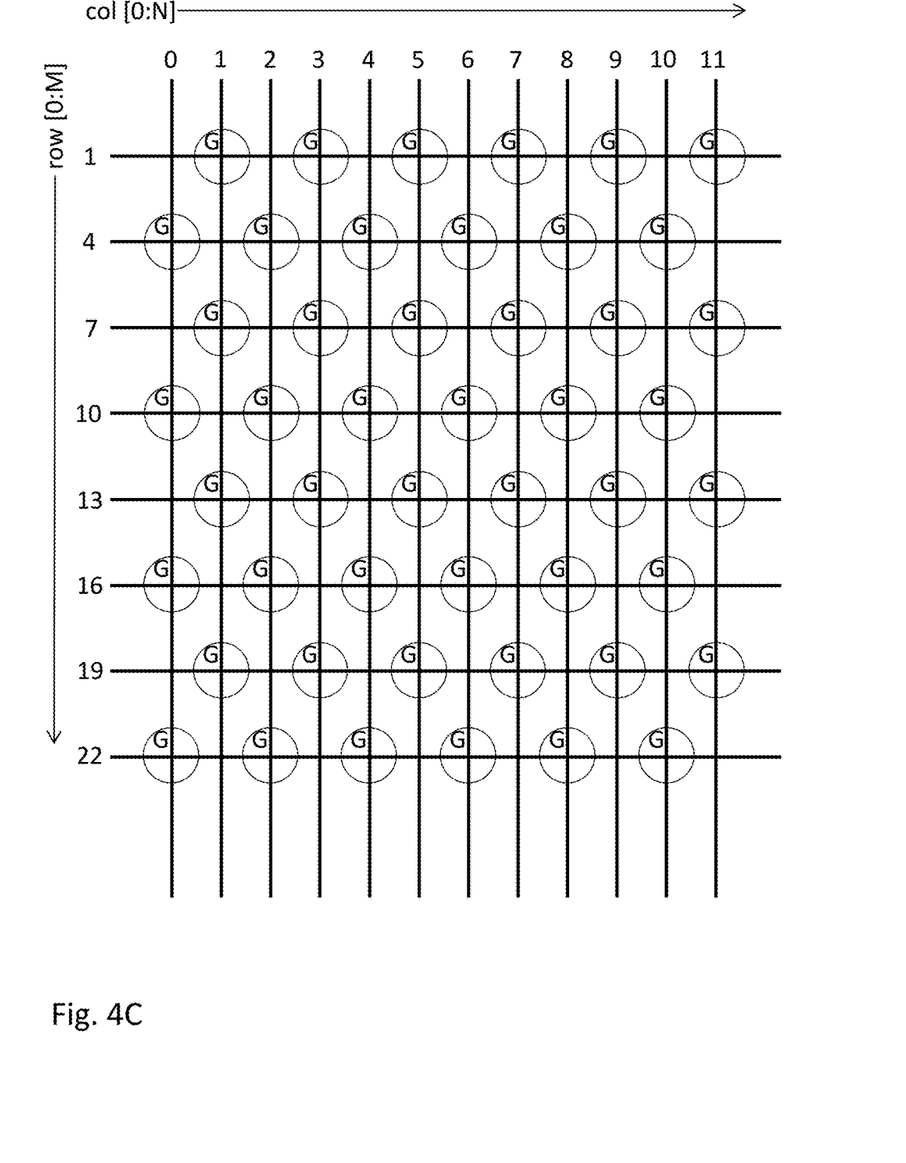
Figure 4D:
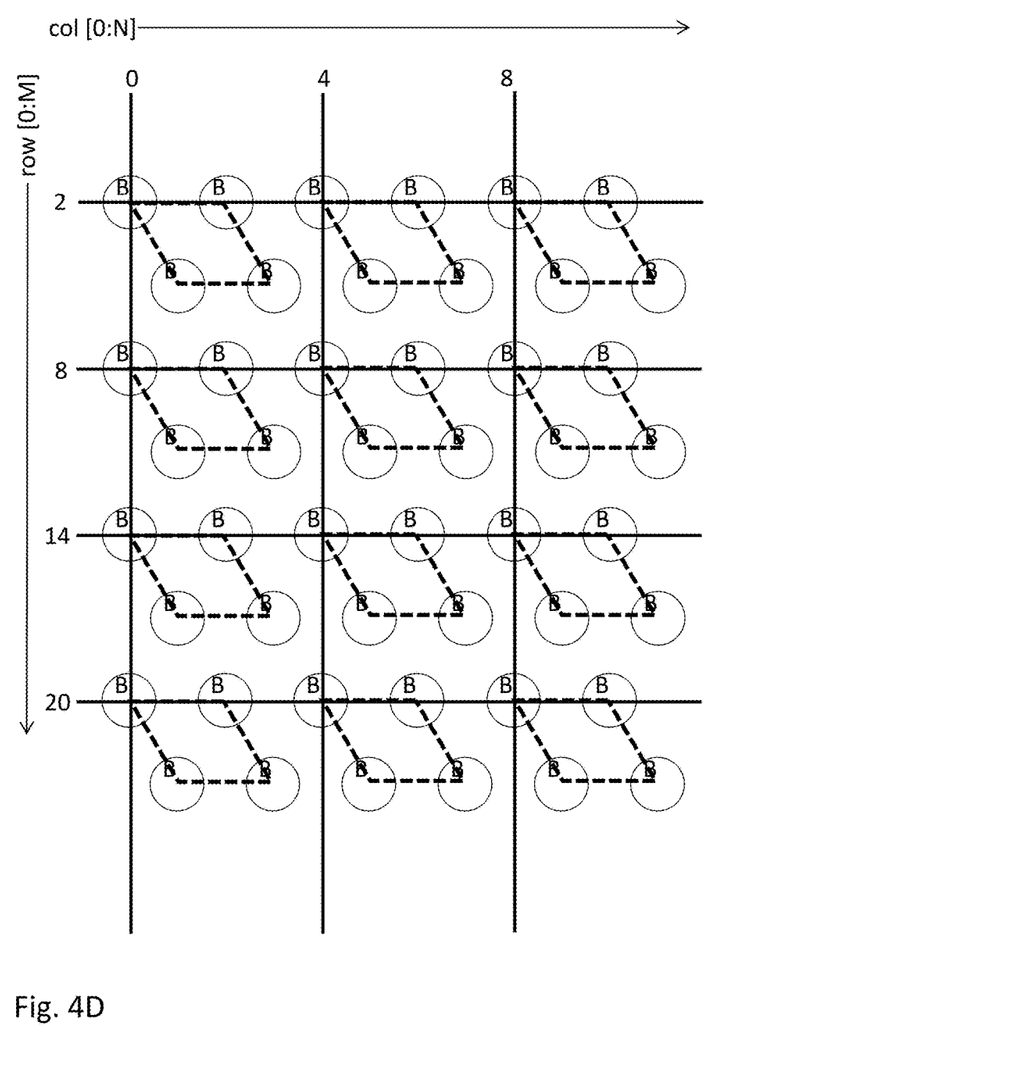

FIGS. 4B, 4C and 4D show row and column addressing of the red, green and blue subpixels, respectively. FIG. 4B shows only those address lines used to address the red subpixels. FIG. 4B shows the address lines used to address the green subpixels. FIG. 4C shows the address lines used to address the blue subpixels. Note that only one address is required for every four blue light emitters. The row address lines 5, 11, and 17 are not used at all and could be eliminated from the array in FIG. 4A, because they address only blue light emitters that do not require separate addressing. In that case, the number of address lines would not be sufficient to address individual blue light emitters.

In FIGS. 4A-4D, the grouping of blue light emitters into 4-emitter subpixels is implemented in hardware by electrical interconnects that couple together groups of four blue light emitters. These interconnects could be implemented on the frontplane. Alternately, they could be implemented on the backplane, with the blue light emitters still separate on the frontplane.

In some implementations, the electrical interconnects may be reconfigurable to allow different subpixel definitions: one emitter per subpixel, two emitters per subpixel, three emitters per subpixel, and so on. The subpixel definitions may vary across one femtoprojector (e.g., according to position on the frontplane) or may vary from femtoprojector to femtoprojector. In the latter case, the reconfigurability would allow the same image source to be used with different femtoprojectors, with one configuration of subpixels for one femtoprojector and a different configuration for a different femtoprojector. In one approach, the ratio of (red plus green subpixels):(blue subpixels) varies to match the distribution of visual receptors on the retina. When the spatial frequency of blue receptors increases, then the spatial frequency of blue subpixels also increases, for example by grouping fewer blue light emitters into each blue subpixel. The reconfigurability may even allow certain subpixels to be turned off. For example, the backplane may turn off the blue subpixels if there are no blue visual receptors in the corresponding section of retina.

In alternate embodiments, the subpixels may also be software defined. For example, each light emitter may remain individually addressable in hardware, with the subpixels defined by the data received by the backplane. In one approach, the backplane receives one pixel value per blue subpixel and replicates that value to produce the same drive signals for four blue light emitters. In another approach, the backplane receives the same pixel value for all four blue light emitters. The subpixel definitions may be reconfigurable in software.

Figure 5A:
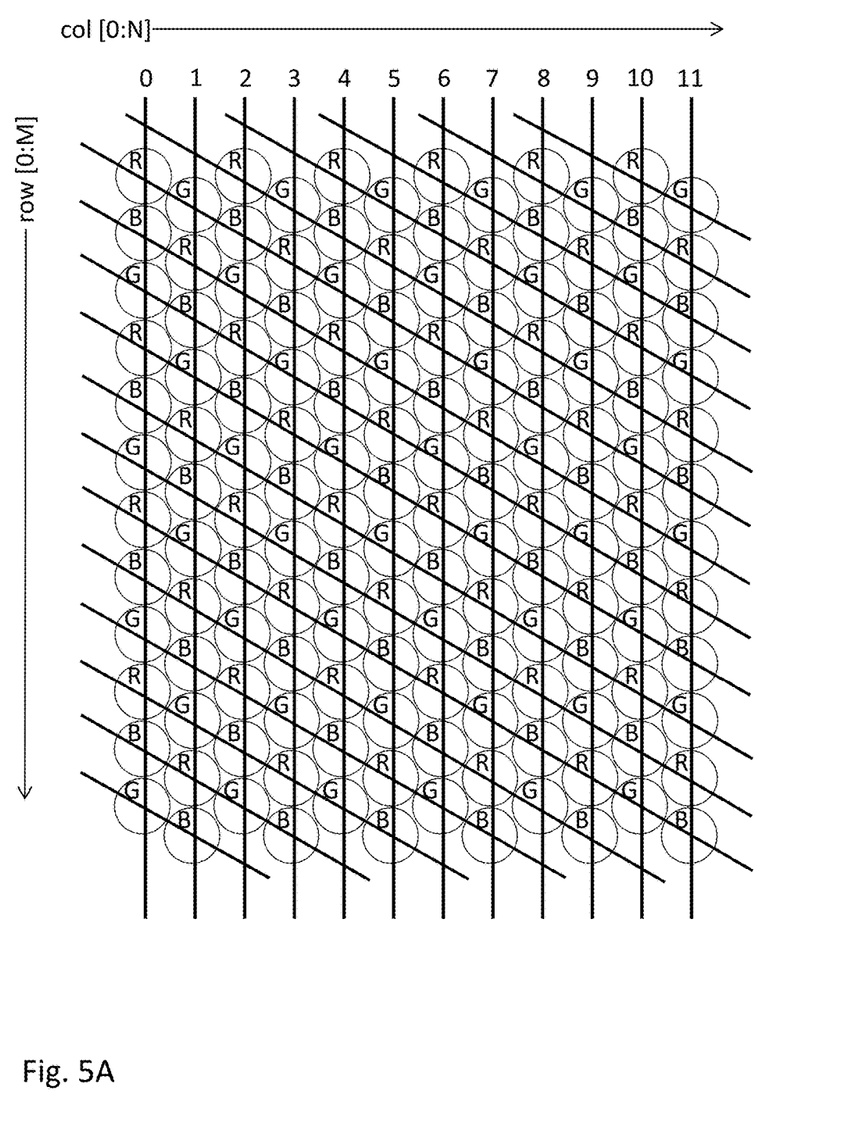
FIGS. 5A-5B show alternate row and column addressing.
Figure 5B:
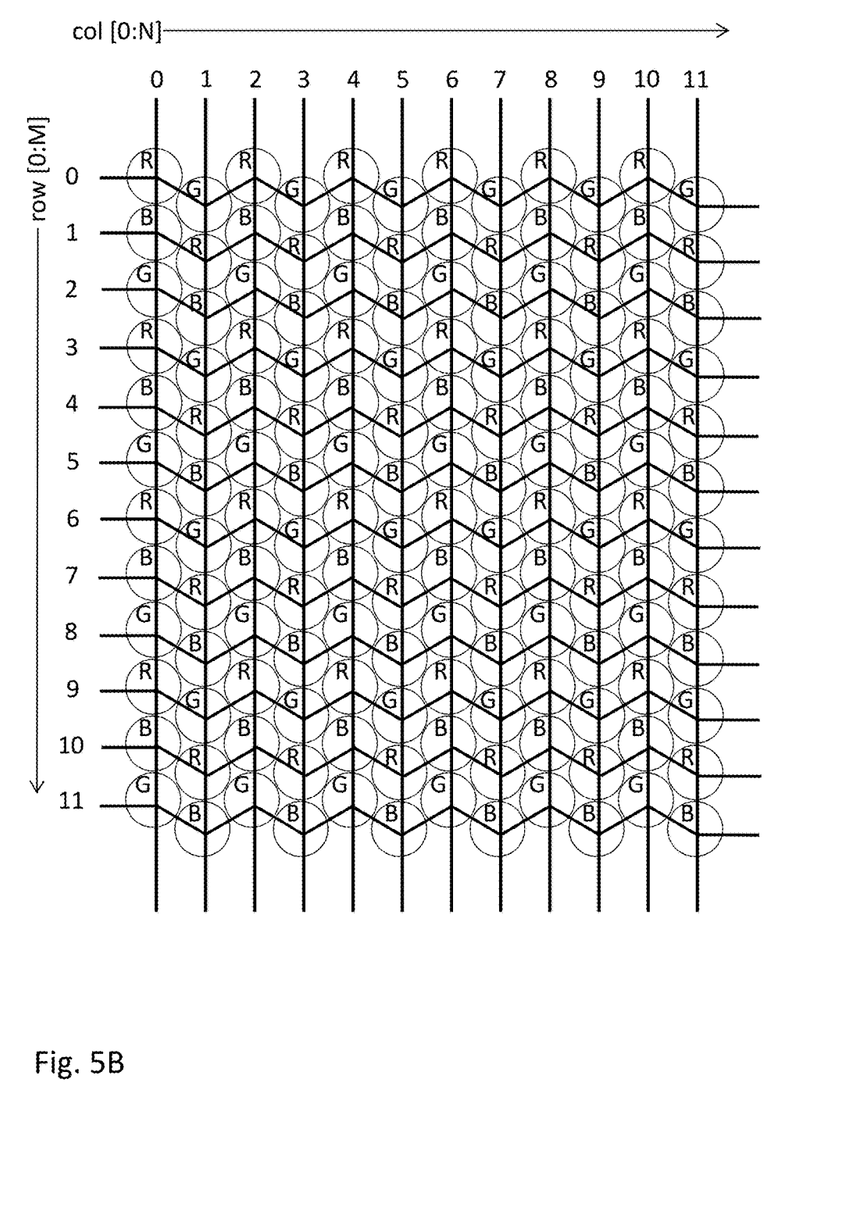

FIGS. 5A and 5B show alternate row and column addressing for a hexagonal array. In FIG. 5A, the rows address lines are slanted so that there is a light emitter at every intersection. This does not waste any intersections, other than when light emitters are grouped into subpixels. In FIG. 5B, the row address lines alternate back and forth between adjacent offset rows of light emitters. This reduces the number of intersections and the number of row address lines compared to FIG. 4A. Further simplification is possible. For example, the blue light emitters in row 2 are not individually addressable, so row 2 could be routed to just the green light emitters and skipping the blue ones.

Figure 6:
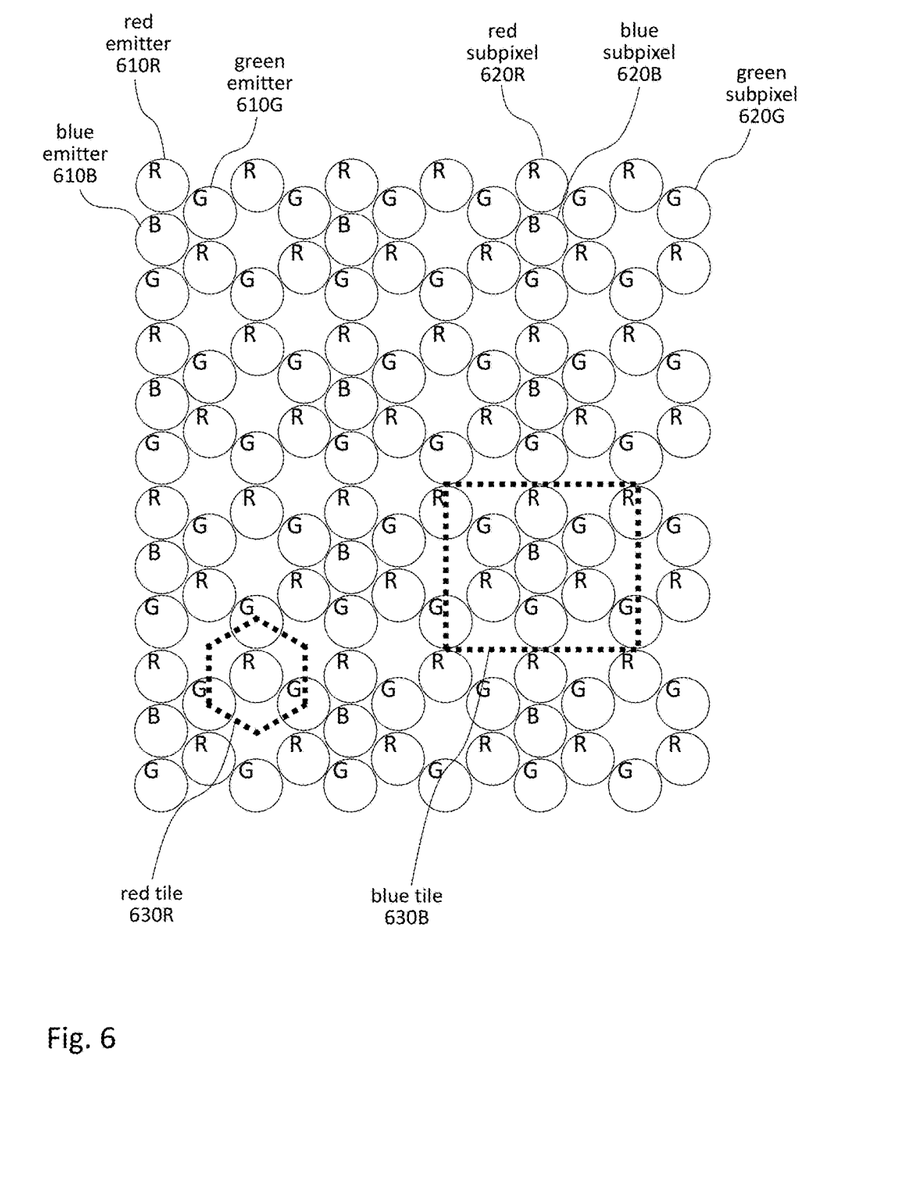
FIG. 6 shows an alternate hexagonal array of red, green and blue light emitters.

FIG. 6 shows an array of red, green and blue light emitters 610R,G,B that is the same as in FIG. 3, except that the number of blue light emitters 610B is reduced by a factor of four. Each subpixel 620 includes just a single light emitter 610. However, the ratio of (red subpixels):(green subpixels):(blue subpixels) is 4:4:1 because there are four times fewer blue light emitters 610B. Optical techniques may be used to diffuse the blue light over a wider area than the light coming from red or green emitters. The blue tile 630B is also differently shaped—rectangular instead of diamond shaped in FIG. 3. In some display technologies, emitters of different colors have different radiant efficiencies. For example, certain types of blue GaN LEDs have about three or four times greater radiant efficiency than red or green ones. Therefore, one blue GaN LED has about the same brightness as three or four red or green GaN LEDs Therefore, the arrangement of FIG. 6 could produce equal radiant power for the red, green and blue channels but with a higher resolution for the red and green channels.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An eye-mounted display comprising:
a contact lens; and
a femtoprojector including a backplane and a frontplane that fit in the contact lens; the frontplane containing an array of red, green and blue light emitters organized into arrays of individually addressable red, green and blue subpixels; the backplane receiving data that specifies images to be projected by the frontplane, the backplane converting the received data to drive signals that drive the subpixels; where a ratio of (red subpixels):(blue subpixels) is at least 3:1 and/or a ratio of (green subpixels):(blue subpixels) is at least 3:1, and each blue subpixel comprises at least two blue light emitters;
electrical interconnects that couple together the blue light emitters to form the blue subpixels; and
row and column addressing, where a number of row and columns address lines is sufficient to address individual blue subpixels but not sufficient to address individual blue light emitters.

2. The eye-mounted device of claim 1 wherein the ratio of (red subpixels):(green subpixels):(blue subpixels) is N:N:1 where N is at least 3.

3. The eye-mounted device of claim 2 wherein N is at least 6.

4. The eye-mounted device of claim 1 wherein both the ratio of (red subpixels):(blue subpixels) is at least 3:1 and the ratio of (green subpixels):(blue subpixels) is at least 3:1.

5. The eye-mounted device of claim 1 wherein each red subpixel includes a single red emitter, each green subpixel includes a single green emitter, and each blue subpixel includes a plurality of blue emitters.

6. The eye-mounted device of claim 1 wherein the frontplane contains an equal number of red emitters, green emitters and blue emitters.

7. The eye-mounted device of claim 1 wherein the electrical interconnects are included in the frontplane whereby the blue light emitters are organized into blue subpixels by the frontplane, and the backplane produces separate drive signals for individual blue subpixels but not for individual blue light emitters.

8. The eye-mounted device of claim 1 wherein the electrical interconnects are included in the backplane, whereby the blue light emitters are organized into blue subpixels by the backplane and not by the frontplane.

9. An eye-mounted display comprising:
a contact lens; and
a femtoprojector including a backplane and a frontplane that fit in the contact lens; the frontplane containing an array of red, green and blue light emitters organized into arrays of individually addressable red, green and blue subpixels; the backplane receiving data that specifies images to be projected by the frontplane, the backplane converting the received data to drive signals that drive the subpixels; where a ratio of (red subpixels):(blue subpixels) is at least 3:1 and/or a ratio of (green subpixels):(blue subpixels) is at least 3:1, and each blue subpixel comprises at least two blue light emitters; and
electrical interconnects that couple together the blue light emitters to form the blue subpixels, wherein the electrical interconnects are reconfigurable to implement different organizations of blue light emitters into blue subpixels.

10. An eye-mounted display comprising:
a contact lens; and
a femtoprojector including a backplane and a frontplane that fit in the contact lens; the frontplane containing an array of red, green and blue light emitters organized into arrays of individually addressable red, green and blue subpixels; the backplane receiving data that specifies images to be projected by the frontplane, the backplane converting the received data to drive signals that drive the subpixels; where a ratio of (red subpixels):(blue subpixels) is at least 3:1 and/or a ratio of (green subpixels):(blue subpixels) is at least 3:1, and each blue subpixel comprises at least two blue light emitters; wherein the blue light emitters are individually addressable and the data received by the backplane determines the organization of blue light emitters into blue subpixels.

11. The eye-mounted device of claim 10 wherein the received data includes one pixel value per blue subpixel, and the backplane produces corresponding drive signals to drive all of the blue light emitters in that blue subpixel.

12. The eye-mounted device of claim 10 wherein the received data includes one pixel value per blue light emitter, and the same pixel value is received for all blue light emitters in a blue subpixel.

13. The eye-mounted device of claim 10 wherein the data is received according to a protocol, and the protocol supports different organizations of blue light emitters into blue subpixels.

14. The eye-mounted device of claim 1 further comprising:
separate row and column addressing for the red subpixels, for the green subpixels and for the blue subpixels.

15. The eye-mounted device of claim 1 wherein the number of emitters per subpixel varies as a function of position on the front plane.

16. The eye-mounted device of claim 1 further comprising:
a plurality of femtoprojectors that fit in the contact lens, where at least two of the femtoprojectors have a different ratio of (red subpixels):(blue subpixels) or a different ratio of (green subpixels):(blue subpixels).

17. The eye-mounted device of claim 16 wherein a ratio of (red subpixels+green subpixels):(blue subpixels) varies as a function of a spatial frequency of visual receptors at a location on a retina to which the subpixels are projected.

18. The eye-mounted device of claim 9 wherein the number of emitters per subpixel varies as a function of position on the front plane.

19. The eye-mounted device of claim 10 wherein the number of emitters per subpixel varies as a function of position on the front plane.

20. The eye-mounted device of claim 10 wherein both the ratio of (red subpixels):(blue subpixels) is at least 3:1 and the ratio of (green subpixels):(blue subpixels) is at least 3:1.

* * * * *